United States Patent Office 3,461,153
Patented Aug. 12, 1969

3,461,153
ORGANIC ESTERS STABILIZED WITH AN ALKALI METAL AND AN ORGANIC PHOSPHITE
Clarence E. Tholstrup and Sarah J. Rush, Kingsport, Tenn., assignors to Eastman Kodak Company, Rochester, N.Y., a corporation of New Jersey
No Drawing. Filed July 19, 1965, Ser. No. 473,234
Int. Cl. C07c 65/82, 65/80
U.S. Cl. 260—475                                                3 Claims

ABSTRACT OF THE DISCLOSURE

Organic esters free from acid hydrogen atoms which are subject to discoloration at elevated temperatures containing from about 0.25 p.p.m. to 1000 p.p.m. of alkali metal atoms and from about 0.1 p.p.m. to 200 p.p.m. of phosphorus atoms.

---

This invention relates to organic esters free from acid hydrogen atoms and containing alkali metal atoms and phosphorus atoms, whereby these esters have greatly enhanced color stability against the effects of prolonged exposure at an elevated temperature.

The presence of alkali metal atoms along with such esters has been contemplated by disclosures such as U.S. 2,825,737, issued Mar. 8, 1958, U.S. 2,867,594, issued Jan. 6, 1959, U.S. 2,938,015, issued May 24, 1960, and other similar disclosures.

The presence of phosphorus atoms along with such esters has been contemplated by disclosures such as U.S. 2,867,594 and U.S. 2,938,015 which are mentioned above, as well as U.S. 2,612,515 issued Sept. 30, 1952, U.S. 2,961,454 issued Nov. 22, 1960, U.S. 3,047,608 issued July 31, 1962, U.S. 3,053,878 issued Sept. 11, 1962, U.S. 3,076,018 issued Jan. 29, 1963 and other similar disclosures such as French Patent 1,306,356 and British Patent 676,553; also see British Patent 978,304.

It is an object of this invention to provide organic esters which remain free from adverse coloration after prolonged exposure at elevated temperatures.

It is a further object to provide such esters which remain substantially free from color even after being held in a molten condition for an extended period of time.

It is another object to provide such esters which contain very small traces of additives whereby there is no significant affect upon the subsequent utility of such esters for essentially all expected purposes.

It is a more particular object to provide dialkyl isophthalates and dialkyl terephthalates having these advantages.

Further objects are also apparent from this specification, including the claims.

According to one preferred embodiment of this invention there is provided a composition of matter having enhanced color stability upon exposure to elevated temperatures consisting essentially of an organic ester of a compound having a hydroxy radical and an organic carboxylic acid, said composition being essentially free of acid hydrogen atoms and containing from about 0.25 p.p.m. to about 1,000 p.p.m. by weight of alkali metal atoms and from about 0.1 p.p.m. to about 200 p.p.m. by weight of phosphorus atoms, said ester being capable of maintaining an APHA color value no greater than about 25 after being heated for 15 hours at 210° C. when containing 20 p.p.m. of an alkali metal compound and 10 p.p.m. a phosphorus compound.

Examples of such organic esters include aliphatic esters or aromatic carboxylic acids such as dimethyl terephthalate, dioctyl phthalate, ethyl benzoate, etc., fatty glycerides such as stearates, palmitates, laurates, acetin, etc., aliphatic esters of aliphatic acids such as ethyl acetate, ethylene diacetate, butyl propionate, dimethyl adipate, dibutyl sebacate, diisopropyl succinate, octyl stearate, etc. Such esters generally have molecular weights well under 1,000 and are not polymeric. An especially great improvement is obtained when the ester is a dialkyl (1 to 4 carbons) ester of isophthalic or terephthalic acid, particularly as regards stabilizing such esters in the molten form as when stored in tanks or transported in railroad tank cars.

Examples of compounds which can be used to provide alkali metal atoms include salts of potassium, sodium, lithium and cesium, especially the salts of organic acids such as the aliphatic and aromatic acid salts. Other compounds include the alkali metal alkoxides (1–6 carbons). The aliphatic or aromatic acids from which these salts can be obtained include aromatic and/or aliphatic substituents. Particular examples include potassium acetate, potassium stearate, cesium propionate, lithium benzoate, sodium oxalate, potassium adipate, lithium butoxide, cerium propoxide, sodium methoxide, potassium isopropoxide, etc. The potassium salts, especially of aliphatic dicarboxylic acids (2–10 carbons) give unexpectedly good results, particularly potassium oxalate.

Examples of compounds which can be used to provide phosphorus atoms are illustrated in the literature and many patents such as those mentioned above and U.S. 2,841,608 issued July 1, 1958, U.S. 2,847,443 issued Aug. 12, 1958, U.S. 2,860,115 issued Nov. 11, 1958, U.S. 2,893,961 issued July 7, 1959, U.S. 2,951,826 issued Sept. 6, 1960, U.S. 3,039,993 issued June 19, 1962, U.S. 3,047,608 issued July 31, 1962, U.S. 3,000,850 issued Sept. 19, 1961, U.S. 3,056,824 issued Oct. 2, 1962, U.S. 3,082,189 issued Mar. 19, 1963 and others. Although all organic phosphites, phosphates and derivatives thereof are considered useful, the degree of effectiveness is dependent upon the class of compounds employed.

Illustrative phosphorus compounds include tri(2,2,4-trimethylpentyl)phosphate, neopentyl phenyl phosphite, neopentyl octadecyl phosphite, polymeric phosphites such as derived from bis(p-hydroxyphenyl)-2,2-propane(Bisphenol A) and pentaerythritol which is commercially available, distearyl pentaerythritol diphosphite which is commercially available, tris(nonylated)diphenylphosphite which is commercially available, triphenyl phosphite, etc. An unexpectedly superior phosphite is 1,4-cyclohexanedimethylene bis(neopentylphosphite) which is disclosed in copending application Ser. No. 308,369 filed Sept. 12, 1963, now U.S. Patent 3,283,037 by Herman E. Davis, entitled, "Bis(cyclic 2,2-dimethyltrimethylene)-1,4-cyclohexanedimethylene Phosphite." Other useful compounds are given elsewhere herein as well as in the reference patents listed hereinabove.

This invention can be further illustrated by the following examples of preferred embodiments although it will be understood that these examples are included merely for purposes of illustration and are not intended to limit the scope of the invention unless otherwise specifically indicated.

The following data were obtained using the identified additive compounds in the specified parts per million by weight in dimethyl terephthalate, the stabilized composition being heated at 210° C. and the time in hours was ascertained to develop an APHA color of 25 and of 75. The initial color in each case had an APHA value of 10.

TABLE I.—STABILIZED DIMETHYL TEREPHTHALATE

| Additives, 20 p.p.m. of alkali metal salt and 10 p.p.m. of organic phosphite | Stability in hours | |
|---|---|---|
| | Aged to APHA, Color of 25 | Aged to APHA, Color of 75 |
| Item Number: | | |
| 1 ............................. None (control) | 1 | 2 |
| Potassium oxalate and items 2, 3 or 4 below: | | |
| 2 ............................. Tris(nonylated)phenyl-phosphite | 20 | >50 |
| 3 ............................. Neopentylphenylphosphite | 23 | >50 |
| 4 ............................. 1,4-cyclohexanedimethanol bis(neopentylphosphite) | 34 | >50 |

Similar results can be obtained using (a) potassium ethoxide and distearyl pentaerythritol diphosphite, (b) potassium acetate and the same or another one of the organic phosphites, (c) sodium stearate and the same or another one of the organic phosphites, (d) sodium benzoate and the same or another one of the organic phosphites, (e) sodium ethoxide and the same or another one of the organic phosphites. Other examples are also apparent from the preceding description of the invention.

The effect of such additives by themselves, rather than in combination, is shown by the following comparative data:

TABLE II.—DIMETHYL TEREPHTHALATE

| Item Number | Additive, 20 p.p.m. employed | Stability in hours | |
|---|---|---|---|
| | | Aged to APHA color of 25 | Age to APHA color of 75 |
| 1 | None (control) | 1 | 2 |
| 2 | Potassium oxalate | 1 | 2 |
| 3 | Sodium stearate | 1 | 3 |
| 4 | Sodium benzoate | 1 | 2 |
| 5 | Potassium ethoxide | 1 | 2 |
| 6 | Sodium ethoxide | 1.5 | 8 |
| 7 | Tris(nonylated)phenylphosphite | 3 | 8 |
| 8 | Neopentylphenylphosphite | 3 | 8 |
| 9 | 1,4-cyclohexanedimethanolbis(neopentylphosphite) | 6 | 10 |

This invention permits the especially advantageous storage of dimethyl terephthalate (DMT) in a molten condition prior to its use as a reactant in the manufacture of highly polymeric linear polyesters such as polyethylene terephthalate or poly(1,4-cyclohexanedimethylene terephthalate). Thus, molten DMT containing 10 p.p.m. of potassium oxalate and 10 p.p.m. of 1,4-cyclohexanedimethanol bis(neopentylphosphite) can be stored at 165° C. for 521 hours before an APHA color value of 15 is obtained. This is unexpectedly good and represents excellent stability against discoloration since even after 521 hours the color rating is unity whereas, the same conditions without any additives results in a poor color rating greater than 8. The presence of 10 p.p.m. of potassium oxalate alone results in a color rating of 2 and the presence of 10 p.p.m. of the phosphite alone results in a color rating of 6. The combination of both additives produces the extremely low color rating of 1 which is excellent.

In practicing this invention it is important to avoid introducing compounds containing acid hydrogen, e.g. NaHSO$_4$ or Na$_2$H$_2$PO$_4$ or the like. It appears that acid hydrogen counteracts the beneficial effects of having an alkali metal present.

Although especially valuable results of particularly surprising usefulness are obtained employing potassium oxalate in combination with 1,4-cyclohexanedimethanol bis(neopentylphosphite), this invention also provides good results not expected from a consideration of the prior art as regards the other related additive combinations described hereinabove when employed to stabilize any of the organic esters as defined herein, e.g. bis(2-hydroxyethyl)terephthalate, etc.

The especially preferred organic phosphites are those which have at least two atoms of phosphorus and at least one ring, all of which rings contain carbon atoms and at least one ring contains a hetero phosphorus atom attached to adjacent hetero oxygen atoms thereby forming a heterocyclic ring. The most particularly preferred and especially advantageous phosphites have at least two such heterocyclic rings.

The following formulas are typical of the especially preferred cyclic phosphite esters of polyhydroxy organic compounds:

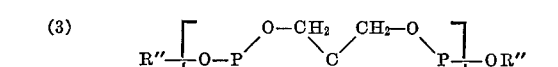

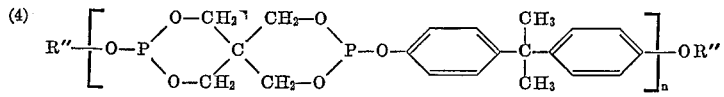

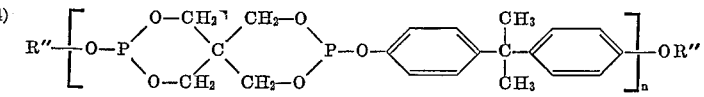

where R and R' each represents a hydrogen atom or an alkyl radical having 1 to 18 carbon atoms, R'' represents a hydrogen atom, an alkyl radical having from 1 to 18 carbon atoms or an aryl radical of the benzene series having from 6 to 12 carbon atoms, X represents a divalent organic radical composed of hydrogen, carbon and oxygen atoms having aliphatic or alicyclic carbon atoms attached to the adjacent —O— atoms shown in the above formula. Preferably X contains from 2 to 20 carbon atoms when it is monomeric in form. It is also advantageous when X is a polyether of ethylene glycol, propylene glycol, tetramethylene glycol, or the like, having a molecular weight up to about 800, e.g., from about 200 to about 600. When monomeric, HO—X—OH represents glycols illustrated by 1,4-cyclohexane-dimethanol, 2,2,4,4-tetramethylcyclobutanediol, ethylene glycol, diethylene glycol, neopentyl glycol, etc. In the above formulas, $n$ is a small integer (usually less than 7) and $m$ is an integer of from 1 to a value such that the compound has a molecular weight no greater than about 4,000.

Although X represents a divalent radical, it can be more complex in that it can be derived from a triol, tetrol, etc. For example, X can represent:

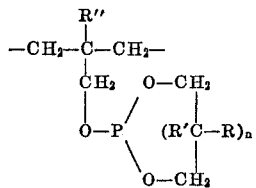

or it can be derived from a tetrol in an analogous manner. Moreover, many of these compounds include terminal constituents derived from monohydroxy organic compounds, e.g., alcohols or phenols as covered by the formula R″—OH such as lauryl alcohol, stearyl alcohol, ethyl alcohol, phenol, cresol, etc.

Among the most advantageous phosphorus compounds are those cyclic phosphite esters having sterically hindered structures such as those derived from neopentyl glycol, 1,4-cyclohexanedimethanol, 2,2,4,4-tetramethyl-cyclobutanediol-1,3, etc. The most especially advantageous compound is disclosed in the above-mentioned Davis application Serial No. 308,369 filed on September 12, 1963.

In the specification reference is made to an APHA color rating. The APHA color standard is described in the Standard Methods for the Examination of Water by American Public Health Association, 10th edition, pages 87–89. The APHA value is based upon the p.p.m. platinum present in an aqueous solution of platinum-cobalt chloride. The APHA color rating ranges from below 25 (essentially colorless) to 500, a dark yellow. APHA values of 75 indicate that a slight yellowness is visibly present in the sample.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. An organic ester selected from the group consisting of dialkyl (1 to 4 carbon atoms) isophthalates and dialkyl (1 to 4 carbon atoms) terephthalates, said ester stabilized by (A) about 0.25 p.p.m. to about 1000 p.p.m. by weight of alkali metal atoms selected from the group consisting of potassium, sodium, lithium and cerium, said alkali metal atoms being provided by at least one alkali metal carboxylate having 2 to 18 carbon atoms or alkali metal alkoxide having 1 to 6 carbon atoms, and (B) about 0.1 p.p.m. to about 200 p.p.m. by weight of phosphorus atoms, said phosphorus atoms being provided by 1,4-cyclohexane-dimethylene-bis(neopentyl phosphite), tris(nonylated phenyl) phosphite, or neopentyl phenyl phosphite.

2. Dimethyl terephthalate stabilized by (A) about 0.25 p.p.m. to about 1000 p.p.m. by weight of potassium atoms provided by potassium oxalate, and (B) about 0.1 p.p.m. to about 200 p.p.m. by weight of phosphorus atoms provided by 1,4-cyclohexane-dimethylene-bis(neopentyl phosphite).

3. The composition of claim 2 wherein said potassium atoms and said phosphorus atoms are each present in amounts of about 10 p.p.m.

References Cited
UNITED STATES PATENTS

| | | | |
|---|---|---|---|
| 2,867,594 | 1/1959 | Hansen et al. | 260—45.7 |
| 2,938,011 | 5/1960 | Gormley | 260—45.7 |

JAMES A. PATTEN, Primary Examiner

E. JANE SKELLY, Assistant Examiner

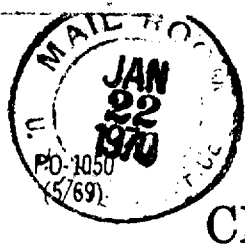

UNITED STATES PATENT OFFICE
CERTIFICATE OF CORRECTION

Patent No. 3,461,153      Dated August 12, 1969

Inventor(s) Clarence E. Tholstrup; Sarah J. Rush

It is certified that error appears in the above-identified patent and that said Letters Patent are hereby corrected as shown below:

Column 2, line 24, "cerium" should read - - cesium - -.

Column 6, Claim 1, line 13, "cerium" should read - - cesium - -.

SIGNED AND
SEALED
JUL 7 1970

(SEAL)
Attest:

Edward M. Fletcher, Jr.
Attesting Officer

WILLIAM E. SCHUYLER, JR.
Commissioner of Patents